Figure 1:
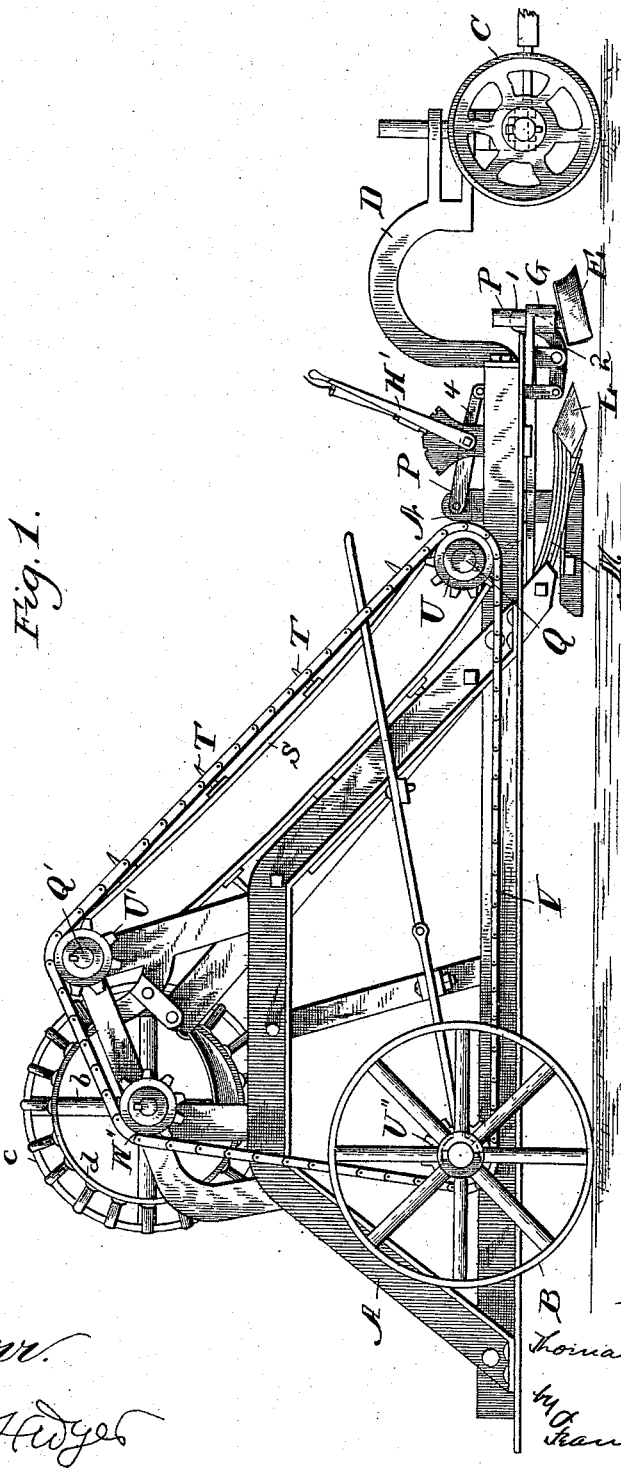

(No Model.) 3 Sheets—Sheet 1.

T. F. MAXWELL, Dec'd.
A. C. MAXWELL, Administratrix.
MACHINE FOR HARVESTING POTATOES.

No. 535,710. Patented Mar. 12, 1895.

Witnesses:
J. B. McGirr.
Leonard Hodges

Inventor
Thomas F. Maxwell
by
Francis L. Dyer
Attorney

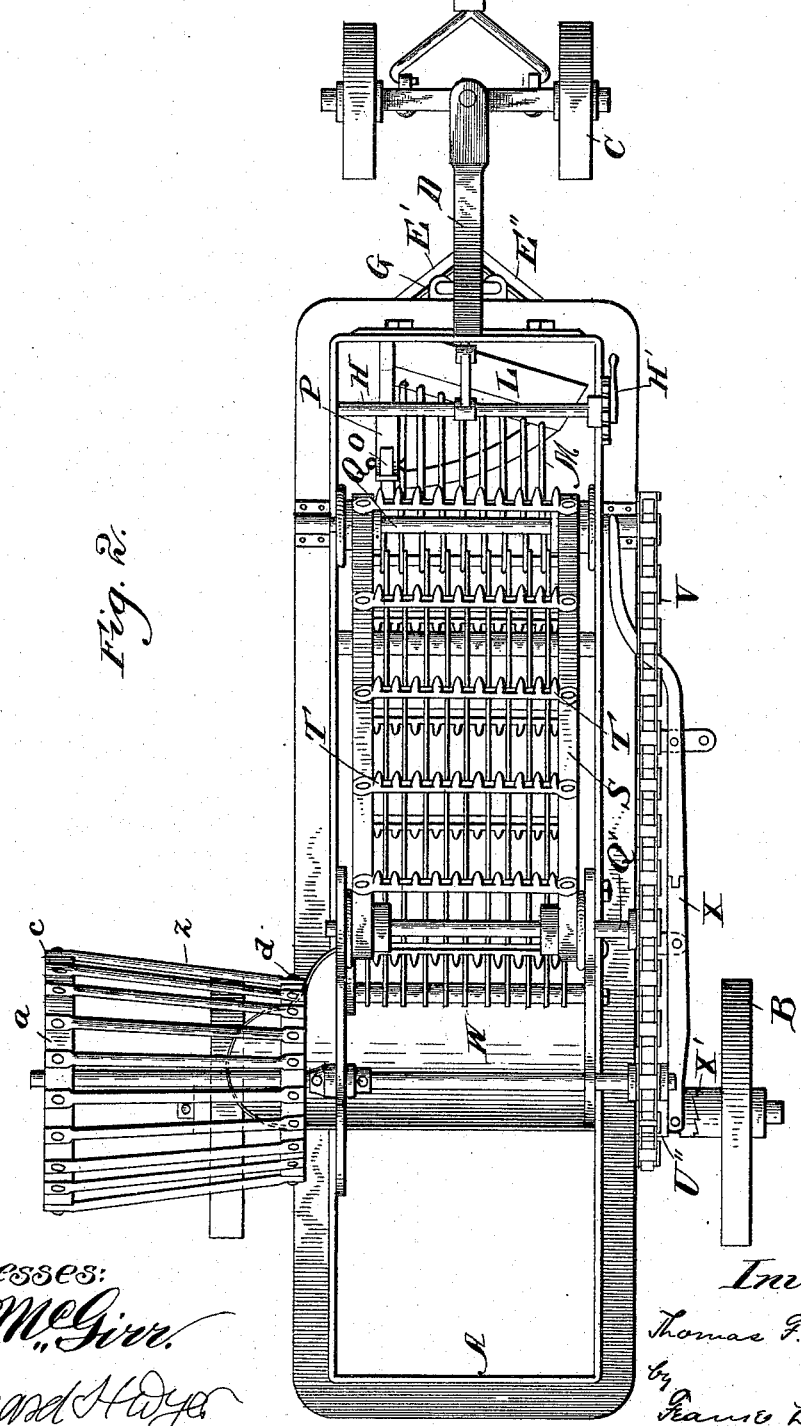

(No Model.) 3 Sheets—Sheet 3.
T. F. MAXWELL, Dec'd.
A. C. MAXWELL, Administratrix.
MACHINE FOR HARVESTING POTATOES.
No. 535,710. Patented Mar. 12, 1895.
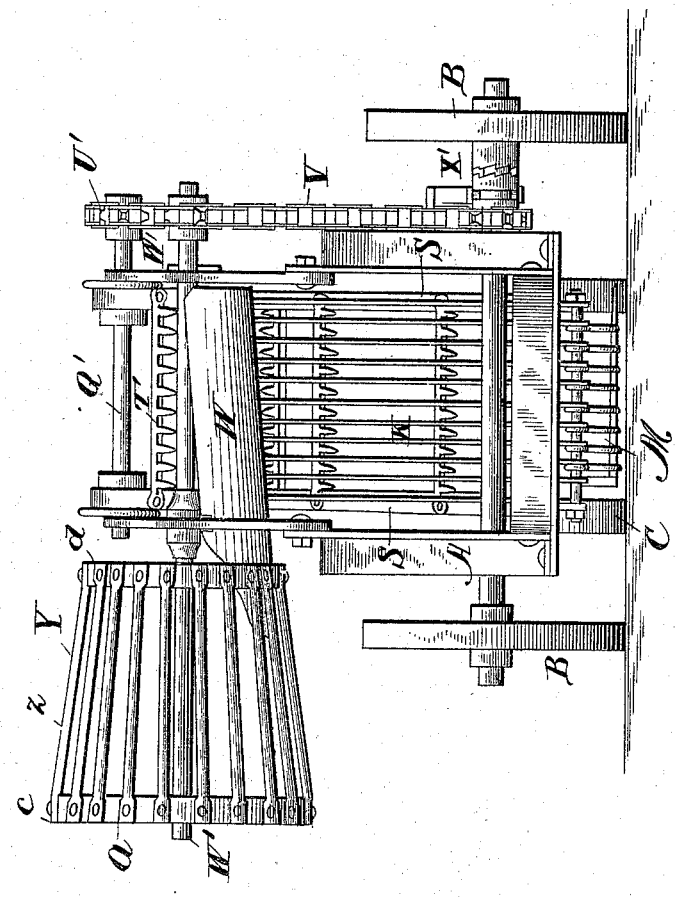
Witnesses:
J. B. McGirr.
Armond Hodges
Inventor:
Thomas F. Maxwell
by Frank L. Dyer
Attorney

UNITED STATES PATENT OFFICE.

THOMAS F. MAXWELL, OF DUBUQUE, IOWA; AMANDA C. MAXWELL ADMINISTRATRIX OF SAID THOMAS F. MAXWELL, DECEASED.

MACHINE FOR HARVESTING POTATOES.

SPECIFICATION forming part of Letters Patent No. 535,710, dated March 12, 1895.

Application filed November 1, 1893. Serial No. 489,737. (No model.)

*To all whom it may concern:*

Be it known that I, THOMAS F. MAXWELL, a citizen of the United States, residing at Dubuque, in the county of Dubuque and State of Iowa, have invented certain new and useful Improvements in Machines for Harvesting Potatoes; and I do hereby declare the following to be a full, clear, and exact description of the invention, which will enable others skilled in the art to which it appertains to make and use the same.

My invention relates to various new and useful improvements in machines for harvesting potatoes.

Heretofore potatoes have been generally harvested by means of a plow which loosens the earth and exposes the potatoes to view, when they are gathered up in any way, but machines have also been made for automatically harvesting potatoes, whereby the potatoes are not only dug up out of the earth, but are also deposited in a suitable receptacle placed upon the harvester, or in a wagon or cart which accompanies the harvester. My invention has special reference to this latter class of automatic machines.

In addition to the fact that my improved potato digger is entirely automatic in its operations, in that it not only loosens the potatoes from the earth, but also deposits them in a suitable receptacle for their reception, my invention possesses the additional advantage of separating the potatoes from any dirt which may be removed with them, and also in sorting the potatoes in grades, the larger and edible potatoes being deposited in a wagon or cart which accompanies the digger, and the smaller or immature vegetables being accumulated in a separate box or compartment to be replanted or to be used for other purposes.

The principal novelties of my improved potato digger consist in a vehicle which is to be drawn over the potato field by a team or in any other way, and which carries a plow or cultivator at its forward end, capable of vertical adjustment into and out of the ground, for digging up and bringing to the surface the potatoes in the hills; also in mounting and providing a vertically adjustable inclined knife or series of vertically adjusted knives or teeth directly in the rear of the before mentioned plow, for gathering up the potatoes which are loosened thereby; also in providing, behind this inclined knife or knives, an elevator consisting of a series of teeth mounted upon an endless belt or belts and working in a stationary inclined slatted bed, for raising the potatoes from said inclined knife or knives; and finally, in connecting the upper end of this elevator by means of an inclined chute, with a horizontally revolving sorting barrel, in the form of a hollow truncated cone, open at both ends and composed of bars, the distance between said bars gradually increasing toward the larger end of this barrel, by reason of the shape thereof, for separating the potatoes as I have mentioned before, whereby the larger and edible potatoes will be deposited in a wagon or cart and the smaller or immature vegetables will be deposited in a suitable box or receptacle carried upon the potato digger for their reception.

For a better comprehension of my invention attention is directed to the accompanying drawings forming a part of this specification, and in which—

Figure 1, is a side view of my improved potato digger. Fig. 2, is a top view of the same, and Fig. 3, is an end elevation.

In all of the above views corresponding parts are designated by the same letters of reference.

The main frame A of the machine is made preferably rectangular in shape, of angle-irons, to obtain great strength and lightness, and is mounted upon the wheels B, B and C, C. The front wheels C, C are mounted upon a suitable axle which is connected to the yoke D by means of an ordinary heavy king-bolt.

The yoke D is rigidly secured to the front of the frame A.

E is a scraper which is composed of the two parts E' and E'', secured side by side as shown. This scraper is secured to the casting F which is free to move vertically within the slides G, G, which are secured to the forward end of the frame A. By mounting this scraper E within the slides G, G, it may be adjusted vertically so as to cut to any desired depth in the ground, or to be lifted entirely clear of the ground. The mechanism whereby this vertical adjustment of the scraper E may be accomplished is clearly illustrated in the drawings. A link 1 is attached to the casting F, and is connected with the horizontal arm 2, which is pivoted to, but beneath the frame A, and the free end of this arm 2 is connected by means of another link 3, to the horizontal arm 4 which is rigidly secured to the shaft H. This shaft H may be rotated by means of the lever H' attached to the end of said shaft, and which is provided with the usual locking mechanism, consisting of a pawl or ratchet engaging with the periphery of a toothed segment. It will be evident that as the lever H' is moved, the shaft H will be partially rotated, which motion will operate the scraper E, either to elevate or lower the same, through the arms 2 and 4 and the links 1 and 3. By means of the before mentioned pawl or ratchet, the scraper will be locked in any position to which it may have been lowered or elevated.

K K are inclined slats or bars which extend from a point some distance below the frame A, to any desired height above the said frame, and which bars or slats are to be supported upon said frame in any suitable way.

M, M are other bars or slats which are hinged to the lower end of the bars or slats K, K, and extend horizontally or nearly so out from the same. These latter bars or slats are connected together at their forward and free ends by means of a horizontal plow L, which travels a short distance in the rear of the scraper E. This plow L is preferably arranged diagonally across the line of draft as is shown in the drawings in order that it may better cut through the soil; but it may be arranged at right angles to the draft if so desired.

N is a vertical arm which is secured to the said plow L and which passes up through a suitable guide O which is secured to the main frame A.

P is an arm rigidly secured to the before mentioned shaft H, and which connects to the vertical arm N just referred to. By means of these arms N and P it will be evident that when the shaft H is rotated, the plow L and the bars or slats M will be elevated or depressed, to any desired extent, whereby the plow L may be adjusted simultaneously with and to the same extent and in the same direction as the scraper E.

The plow L should be slightly below the scraper E, whereby the functions of the scraper E will be to loosen and break up the hard surface of the hills, and the function of the plow L traveling behind the same, and in the softer dirt, will be to gather up the potatoes from the hills, and allow them to pass up on the hinged bars or slats, M.

Q is a horizontal shaft which is mounted to the main frame of the machine, adjacent to the lower end of the inclined bars K before referred to, which constitute the stationary inclined slatted bed to which reference was made in the first part of the specification. Q' is a similar shaft mounted adjacent to the upper end of this slatted bed. These shafts Q and Q' are provided with band or face wheels, over which extend the endless belts S, S. Instead of these belts, ordinary sprocket chains may be made use of, in which case sprocket wheels should be mounted on the shafts Q and Q' in lieu of the face wheels before mentioned. The particular advantage which sprocket wheels and sprocket chains possess over the former arrangement is, that there can be no possibility of their slipping, but one form is merely the equivalent of the other, and it is to be understood that I make use of either, or of any other similar mechanical arrangement.

T, T are rakes which extend horizontally across from one band or sprocket chain S to the other, and which are arranged suitable distances apart. Those teeth which are on the under side of the belts or sprocket chains S, S, work between the bars K of the inclined slatted bed, so as to elevate any potatoes up along the latter. It is to be mentioned here that the outside bars K of this inclined slatted bed are of greater diameter than the intermediate bars of the same, whereby sides will be formed for said slatted bed, to prevent any potatoes from rolling off of the same.

U is a sprocket wheel which is mounted on one end of the shaft Q. U' is another and similar sprocket wheel which is mounted on the corresponding end of the shaft Q'. U'' is another sprocket wheel which is mounted loosely on the back main axle of the machine.

X is a lever pivoted to the main frame of the machine, with its handle-end in close proximity to the driver, and with its other end secured to the said sprocket wheel U'', whereby the latter may be moved laterally on its axle to be engaged with or disengaged from an ordinary clutch X'.

V is a sprocket chain, which is an endless chain and connects the sprocket wheels U U' and U''.

W is a trough or chute which is mounted upon the machine, adjacent to, but slightly below, the upper end of the inclined slatted bed, whereby any potatoes which may be elevated up the slatted bed will drop into the said inclined chute. This said inclined trough or chute W is preferably made of sheet metal, although it may be constructed of wood or of any other material.

W' is a shaft mounted directly above the inclined trough or chute W and which extends some distance to one side of the machine. The other end of this horizontal shaft W' is provided with a sprocket wheel W'', with which the sprocket chain V, before referred to, engages. On that portion of the axle W' which extends out to one side of the machine, is mounted the sorting barrel Y, which is in the form of a truncated cone as shown, its smaller end being adjacent to the side of the machine. This sorting barrel consists of a wheel a mounted on the extreme end of the shaft W', and provided with the ordinary spokes b and the periphery or band c.

Z are bars or slats which are rigidly secured at suitable points to the said periphery c of the wheel a, and which are secured at their other ends, to the circular band d, which is of smaller diameter than the periphery c. By this arrangement—that is to say, by making the band d, of smaller diameter than the periphery c, of the wheel a, it will be evident that the bars Z, will be arranged quite close together at the band d, and will gradually separate as they approach the periphery c.

The trough or chute W, before referred to, extends into the interior of the sorting barrel Y, so that any potatoes which may be deposited in said trough or chute will immediately pass therefrom into said sorting barrel.

The operation of my improved potato digger is as follows: The device is to be drawn over the potato field by a team of horses or in any suitable way, and by means of the lever X the sprocket wheel U'' is to be forced into an engagement with the clutch X' whereby the said sprocket wheel U'' will act to drive the sprocket chain V, which, operating the sprocket wheels U, U' will rotate the shafts Q Q' and will cause the belts or sprocket chains S, S to be operated, whereby the rakes T, T will be moved up the inclined slatted bed. This movement of the sprocket chain V will also rotate the sprocket wheel W'' whereby the sorting barrel Y will be rotated. By means of the adjusting mechanism, before mentioned, the scraper E and the plow L are lowered to the desired depth. The scraper E will loosen the hard surface dirt around the potatoes, and force it to one side, and the plow L traveling in the softer dirt will gather or scoop up the potatoes on the hinged bars M. These potatoes will be gathered up by the teeth T, and will be elevated up the inclined slatted bed. By constructing this slatted bed as I have before mentioned, it will be evident that as the potatoes are elevated up thereon, they will be freed of any dirt which may cling to them. These potatoes, after they have reached the top of the slatted bed, will be deposited into the inclined trough or chute W, down which they will pass into the sorting barrel Y. This sorting barrel owing to its rapid revolutions and to its truncated shape will tend to force the potatoes toward its larger end. The potatoes enter the sorting barrel at its smaller end where the slats or bars Z Z are quite close together, and the smaller or immature vegetables will drop through the said bars Z into a suitable box or receptacle (not shown) placed beneath the same for their reception. The larger potatoes, being of greater diameter than the distance between the bars Z, will pass entirely out of the sorting barrel Y and will be deposited in a cart or wagon (also not shown) which follows the potato digger around the field. The rapid revolution of the sorting barrel also tends to further free the potatoes of any dirt which may have failed to be removed from the same in their passage up the slatted bed. When the device has fulfilled its functions, the scraper E and the plow L, are lifted entirely free of the ground, and the lever X is moved so as to disengage the sprocket wheel U'' from the clutch X', whereby the parts will remain stationary as the machine is drawn from the field.

Having now described my invention, what I claim as new therein, and desire to secure by Letters Patent, is as follows:

In an improved potato digger, the combination of the scraper E; the plow L working directly in the rear of said plow; mechanism for simultaneously adjusting said scraper and said plow; bars or slats M connected with said plow L; and an inclined stationary slatted bed, connected at its lower end with said bars or slats M; the shaft Q mounted near the lower end of said slatted bed; the shaft Q' mounted near the upper end of said slatted bed; endless belts or chains S, carried by said shafts; rakes T mounted upon and operated by said endless belts or chains S, adjacent to said slatted bed; the sprocket wheel U on the end of said shaft Q; sprocket wheel U' on the end of said shaft Q'; the sprocket wheel U'' on the main supporting axle; the sprocket chains V connecting and operating said sprocket wheels U, U', and U''; the inclined trough or chute W, near the upper end of said slatted bed; the shaft W' mounted above said inclined trough or chute; the sprocket wheel W'', on the end of said shaft W', and engaging with and operated by said sprocket chain V; and the sorting barrel Y on the other end of said axle W', consisting of the wheel a, having the periphery c; the band d of smaller diameter of said periphery, and the bars Z, connecting said periphery c, and said band d, all combined and arranged, substantially as and for the purposes described.

In testimony whereof I affix my signature in presence of two witnesses.

THOMAS F. MAXWELL.

Witnesses:
JOHN L. BUETTELL,
MONROE M. CADY.